US012632292B2

(12) United States Patent
Makaya et al.

(10) Patent No.:  US 12,632,292 B2
(45) Date of Patent:  May 19, 2026

(54) COMPUTING TASK SCHEDULING BASED ON AN INTRUSIVENESS METRIC

(71) Applicant: HEWLETT-PACKARD DEVELOPMENT COMPANY, L.P., Spring, TX (US)

(72) Inventors: Christian Makaya, Palo Alto, CA (US); Madhu Sudan Athreya, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 719 days.

(21) Appl. No.: 17/920,328

(22) PCT Filed: Apr. 23, 2020

(86) PCT No.: PCT/US2020/029587

§ 371 (c)(1),
(2) Date: Oct. 20, 2022

(87) PCT Pub. No.: WO2021/216073

PCT Pub. Date: Oct. 28, 2021

(65) Prior Publication Data

US 2023/0168925 A1      Jun. 1, 2023

(51) Int. Cl.
*G06F 9/48*        (2006.01)
*G06F 9/30*        (2018.01)

(52) U.S. Cl.
CPC ........ *G06F 9/4881* (2013.01); *G06F 9/30036* (2013.01); *G06F 9/3004* (2013.01)

(58) Field of Classification Search
CPC ................................................... G06F 9/4881
See application file for complete search history.

(56) References Cited

U.S. PATENT DOCUMENTS

| | | | |
|---|---|---|---|
| 9,143,403 B2 | 9/2015 | Faraboschi et al. | |
| 9,916,177 B2 | 3/2018 | Goncalves De Aguiar et al. | |
| 2003/0056199 A1 | 3/2003 | Li et al. | |
| 2014/0229679 A1* | 8/2014 | Santhanam | G06F 16/9574 |
| | | | 711/135 |
| 2016/0139949 A1 | 5/2016 | Jagannath et al. | |
| 2017/0149690 A1* | 5/2017 | Le Rudulier | H04L 47/821 |
| 2018/0129967 A1* | 5/2018 | Herreshoff | G06N 20/00 |

(Continued)

FOREIGN PATENT DOCUMENTS

WO          2003/025752 A2       3/2003

OTHER PUBLICATIONS

Li et al. ("Machine Learning Based Online Performance Prediction for Runtime Parallelization and Task Scheduling", 2009 IEEE International Symposium on Performance Analysis of Systems and Software (Year: 2009).*

(Continued)

*Primary Examiner* — Wissam Rashid
(74) *Attorney, Agent, or Firm* — Quarles & Brady LLP

(57)              ABSTRACT

Examples of computing task scheduling based on an intrusiveness metric are described. In an example, an intrusiveness metric that indicates an impact of a computing task on performance of a computing device may be determined with an intrusiveness machine learning model. The intrusiveness metric may be sent to a scheduler device to determine distribution of additional computing tasks according to a scheduling machine learning model.

19 Claims, 5 Drawing Sheets

300

Perform a computing task assigned by a scheduler device — 302

Determine an intrusiveness metric that indicates the impact of the computing task on performance of a computing device, the intrusiveness metric being determined with an intrusiveness machine learning model — 304

Send the intrusiveness metric to the scheduler device to determine distribution of additional computing tasks according to a scheduling machine learning model — 306

(56) References Cited

U.S. PATENT DOCUMENTS

| | | |
|---|---|---|
| 2019/0042937 A1 | 2/2019 | Sheller et al. |
| 2020/0027033 A1 | 1/2020 | Garg et al. |
| 2020/0050951 A1 | 2/2020 | Wang et al. |
| 2021/0133555 A1* | 5/2021 | Qiu ...................... G06N 3/0464 |

OTHER PUBLICATIONS

Lim, W. Y. B., et al. "Federated learning in mobile edge networks: A comprehensive survey," arXiv preprint arXiv:1909.11875, Feb. 28, 2020, pp. 1-34.
Ren, J., et al. "Federated learning-based computation offloading optimization in edge computing-supported internet of things." IEEE Access, vol. 7, Jun. 7, 2019, pp. 69194-69201.

* cited by examiner

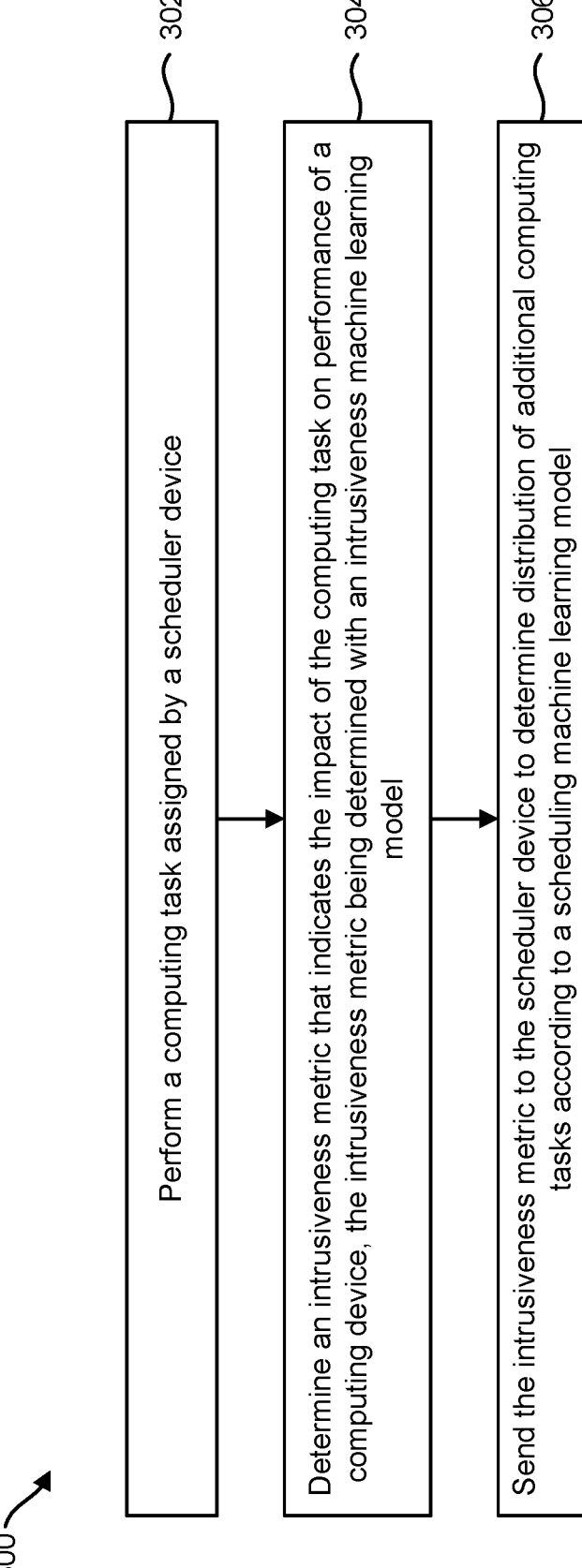

300

302

Perform a computing task assigned by a scheduler device

304

Determine an intrusiveness metric that indicates the impact of the computing task on performance of a computing device, the intrusiveness metric being determined with an intrusiveness machine learning model

306

Send the intrusiveness metric to the scheduler device to determine distribution of additional computing tasks according to a scheduling machine learning model

FIG. 3

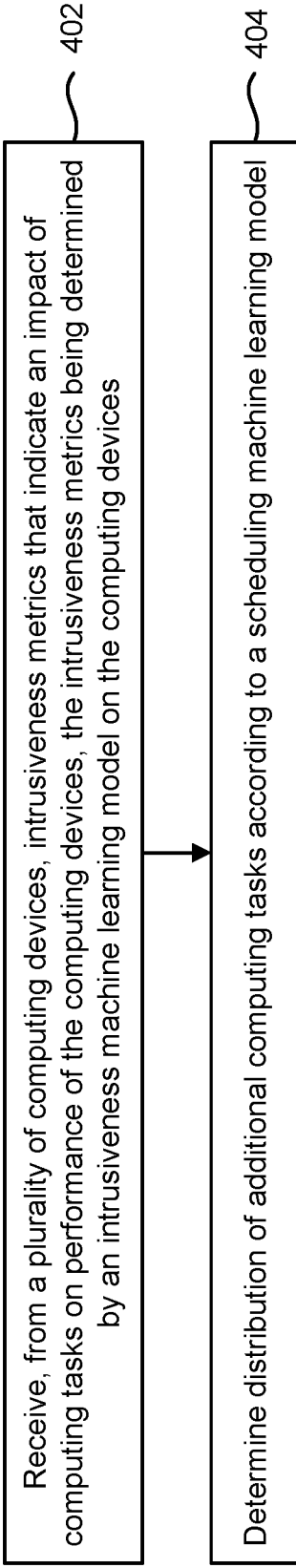

402

Receive, from a plurality of computing devices, intrusiveness metrics that indicate an impact of computing tasks on performance of the computing devices, the intrusiveness metrics being determined by an intrusiveness machine learning model on the computing devices

404

Determine distribution of additional computing tasks according to a scheduling machine learning model

COMPUTING TASK SCHEDULING BASED ON AN INTRUSIVENESS METRIC

BACKGROUND

Computing devices may be used to perform computing tasks. For example, computing devices may be employed to perform machine learning tasks. In some examples, computing devices may communicate with other computing resources in a network environment.

BRIEF DESCRIPTION OF THE DRAWINGS

Various examples will be described below by referring to the following figures.

FIG. 3 is a flow diagram illustrating an example method by a computing device; and FIG. 4 is a flow diagram illustrating an example method by a scheduler device.

Figure 1:
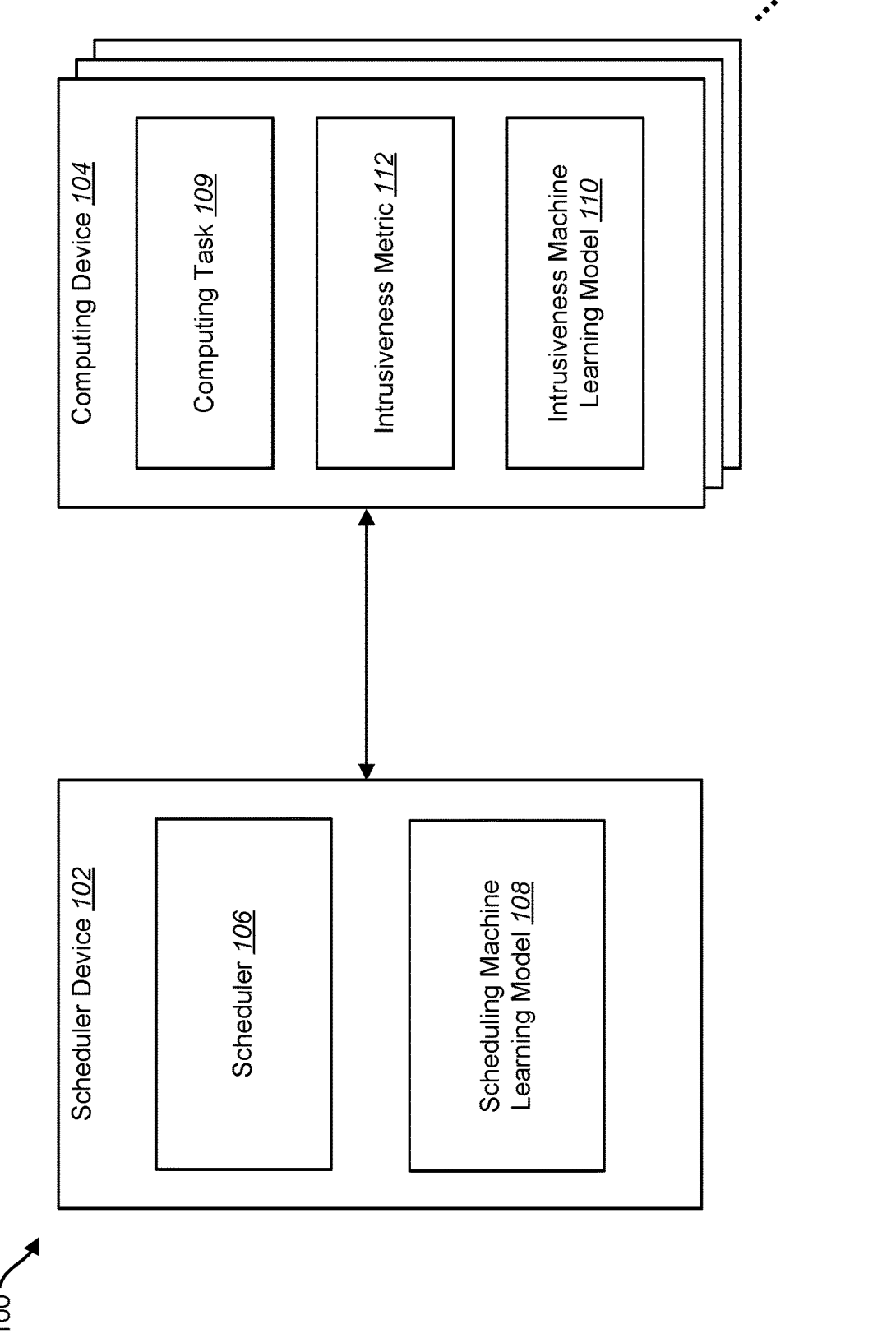
FIG. 1 is a block diagram of an example of a scheduler device and computing devices for computing task scheduling based on an intrusiveness metric.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations in accordance with the description; however, the description is not limited to the examples and/or implementations provided in the drawings.

DETAILED DESCRIPTION

The techniques described herein relate to scheduling of computing devices to perform computing tasks. A computing device may communicate with other devices through a network. Some examples of a computing device include internet-of-things (IoT) devices, desktop computers, laptop computers, tablet computers, mobile devices, workstations, edge gateways, autonomous vehicle systems, robotic devices (e.g., manufacturing, robotic surgery, search and rescue, firefighting), building automation controllers, and human physical-augmentation devices.

The task scheduling of computing devices described herein may be performed using a machine learning (e.g., federated learning) approach. A computing device (also referred to as a worker or edge device) may receive a computing task and performs the computing task. The computing device may determine an intrusiveness metric that indicates an impact of the task on the performance of the computing device. The computing device may also report back the results of the computing task combined with the intrusiveness metric. Therefore, the analysis of the intrusiveness may be performed locally on the computing devices performing the computing tasks. In some examples, a computing device may determine the intrusiveness metric using a local machine learning model.

Some examples of the techniques described herein may utilize a machine learning model or models (e.g., deep learning) to schedule computing tasks. For example, machine learning (e.g., deep learning, neural network(s), etc.) may be applied to determine the intrusiveness of computing tasks and to schedule additional computing tasks based on the intrusiveness.

Examples of the machine learning models described herein may include neural networks, deep neural networks, spatio-temporal neural networks, etc. For instance, model data may define a node or nodes, a connection or connections between nodes, a network layer or network layers, and/or a neural network or neural networks. Examples of neural networks include convolutional neural networks (CNNs) (e.g., basic CNN, deconvolutional neural network, inception module, residual neural network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of a neural network or neural networks may be utilized.

The intrusiveness metrics may be sent to a scheduler device, which aggregates the results. The scheduler device may determine the distribution of additional tasks using a machine learning approach based on the aggregated intrusiveness metrics received from the computing devices. Therefore, improved task scheduling is provided for federated learning of edge devices.

Efficient scheduling and orchestration of computing resources may be performed in a distributed machine learning context. For example, efficient management of machine learning and artificial intelligence resources may be used to provide high performance of applications run on computing devices. Furthermore, data privacy is a concern in the case of edge devices located at different sites or on-premises data centers, where the edge devices may collect data that cannot be shared across or uploaded to a central storage (e.g., cloud). As used herein, "edge devices" include mobile devices, workstations, notebooks, laptops, edge gateway, IoT devices, etc.

Federated Learning (FL) is an approach to enable distributed machine learning on computing devices while preserving privacy of data. An FL system is a network of computing devices (also referred to as FL workers) and a scheduler device (also referred to as an aggregation node or FL server). In some examples, computing devices used as FL workers may be diverse and heterogeneous, with different connectivity link capabilities.

In an example, machine learning jobs (e.g., training) may be run on computing devices while preserving data privacy, improving utilization, and job completion time, without loss or degradation of machine learning performance and accuracy. To achieve such a goal, the machine learning jobs may be scheduled efficiently. Instead of using predictive analytics based on time-series, federated learning and execution trace (e.g., instructions issued/retired) may be utilized for a deeper understanding of the computing devices to determine how computational resources (e.g., processors) perform when jobs have been deployed. By using FL, the level of intrusiveness of a computing task (also referred to as a job) may be determined. This intrusiveness metric may be reported back to the scheduler device that is retrained to optimally schedule and allocate computing tasks on the computing devices during future iterations.

FIG. 1 is a block diagram of an example of a scheduler device 102 and computing devices 104 for computing task scheduling based on an intrusiveness metric 112. The schedule device 102 may communicate with the computing devices 104 in a network 100. The computing devices 104

(also referred to as edge devices) may be mobile devices, workstations, notebooks, laptops, edge gateway, IoT devices, etc.

In this example, the scheduler device 102 may be a server computer, a personal computer, a smartphone, a tablet computer, cloud service, etc. The scheduler device 102 may include and/or may be coupled to a processor and/or a memory. In some examples, the scheduler device 102 may include a display and/or an input/output interface. The scheduler device 102 and the computing devices 104 may include additional components (not shown) or some of the components described herein may be removed and/or modified without departing from the scope of this disclosure.

In some examples, the computing devices 104 (e.g., edge resources) may be heterogeneous, their network connectivity may be limited, and they may be under-utilized or over-utilized. The size of machine learning models is increasing (e.g., to hundreds of millions of parameters). The computing devices 104 may have different capabilities (e.g., CPU, memory, GPU, MLA, and disk size). Furthermore, with multitask learning, insights and intelligence from one application can be provided to other applications and services to improve performance. The management of the services or applications that edge devices provide may be based on the data collected (e.g., log, execution trace, etc.) or generated by these devices and applications. The management and orchestration of computing tasks that are run on the computing devices 104 are two main aspects of application lifecycle management.

The selection of computing devices 104 (e.g., FL workers) in a federated learning procedure is described herein. The scheduling may be used to determine when machine learning tasks should be executed and on which computing devices 104. In some approaches, computing devices 104 may be randomly selected as FL workers or when they are idle, connected to unmetered network (e.g., Wi-Fi), or are charging. However, these metrics may not be enough to characterize appropriate and relevant devices to perform computing tasks. The computational resources might be very dynamic in FL systems, for example depending on the time of the day and the current usage. Moreover, computing devices 104 may not be dedicated to a given application. Therefore, various applications running on the devices have an impact on the overall performance of computing devices 104 as well as on the other applications.

Furthermore, operations and activities in FL systems may occur on the computing devices 104 (e.g., edge devices) that are not under the control of the owners or deployers of the computing task. In this environment, activities of the computing devices 104 may be understood and characterized by monitoring the health and performance of computing devices 104 as well as their capabilities through intrusiveness metrics 112.

The scheduler device 102 may include a scheduler 106 that assigns computing tasks 109 to computing devices 104. In some examples, the scheduler 106 may be implemented by a processor of the scheduler device 102. In some examples, the computing task 109 may be a training task for machine learning (e.g., deep learning, neural network(s), etc.). For example, the scheduler 106 may select computing devices 104 to perform machine learning training using a local dataset of the computing devices 104. An example of a distributed machine learning scenario is described in connection with FIGS. 2A and 2B.

Upon receiving the computing task 109, a computing device 104 may determine an intrusiveness metric 112 that indicates an impact of the computing task 109 on the performance of the computing device 104. The intrusiveness metric 112 may be determined with an intrusiveness machine learning model 110.

The intrusiveness metric 112 may characterize the intrusiveness of the computing task 109 on other simultaneous processes performed by the computing device 104. As used herein, "intrusiveness" refers to the impact that the computing task 109 has on the performance of the computing device 104. For example, if other processes (e.g., programs) are running on a computing device 104, then the computing task 109 may degrade the performance of those processes. This may result in high intrusiveness. In another example, the computing task 109 may not degrade the performance of processes on the computing device 104, which results in low intrusiveness.

In some examples, the computing devices 104 may include a trained intrusiveness machine learning model 110 that generates the intrusiveness metric 112. Performance parameters of the computing device 104 may be input into the intrusiveness machine learning model 110. Examples of the performance parameters that may be provided to the intrusiveness machine learning model 110 include CPU usage, memory usage, GPU usage, disk usage, input/output interface usage, the operating system (OS) of the computing devices 104, the percentage of CPU maximum frequency, the percentage of CPU throttled cycles, the percentage of resources stalls for a given application (e.g., machine learning training task) execution, etc.

In some examples, the performance parameters may be collected as a trace using, for example, a counters engine. Such collection of traces (e.g., time series data) may occur given a defined sampling time resolution (e.g., time intervals may be from 1 millisecond to one second). Furthermore, features engineering can be performed on the dataset for representing non-numerical data in appropriate formats. This trace may be used as input data to the intrusiveness machine learning model 110 for online training or transfer learning and to predict the performance of the computing task 109 on a given edge computing device 104. The intrusiveness metric 112 may be defined through timestamps and may be generated when a computing task 109 (e.g., block of code) starts and ends. For the prediction, a subset of the trace can be used as inputs. Hence, the intrusiveness machine learning model 110 may predict the intrusiveness metric 112 of the task on the computing device 104.

In some examples, the intrusiveness machine learning model 110 may determine the intrusiveness metric 112 of the computing task 109 at a course level based on CPU utilization and/or CPU power states. In this case, indicators such as CPU utilization and/or CPU power states may indicate intrusion. For instance if the CPU utilization is at 70%, and the intrusiveness machine learning model 110 determines that the computing task 109 will take more than 50%, then this computing task 109 will be intrusive. In this case, the scheduler 106 may find a different target computing device 104 for the computing task 109.

In some examples, the intrusiveness machine learning model 110 may determine the intrusiveness metric 112 of the computing task 109 at the level of processor microarchitecture of the computing device 104, which may offer a granular-level understanding of the intrusiveness of the computing task 109. For example, the intrusiveness metric 112 may be based on performance counters, instruction and branch traces, debug registers and/or other runtime visibility into the microarchitecture state of a processor (e.g., CPU, GPU, and/or machine learning accelerator).

In an example, a processor (e.g., CPU) microarchitecture may have limited resources. For instance, the processor microarchitecture may hold the context of a certain thread that is in execution with some registers, translation lookaside buffers (TLBs) and/or cache lines. A multi-threaded microarchitecture may have provisions for carrying multiple context states at once, so long the sum total remains less than the total available microarchitecture state-saving registers/random access memory (RAM). The microarchitecture may vary substantially from different processor products. Furthermore, the tasks that are running will have their own unique states, which create a large number of possibilities for determining intrusiveness.

In another example, not all intrusion matters equally. For instance, branch prediction and/or prefetching may be used to determine intrusiveness within a thread. However, a thread switch to support a new workload may disrupt the branch prediction and/or prefetching, resulting in mis-predictions of intrusiveness.

The intrusiveness machine learning model 110 may be used to learn the intricate patterns of the processor microarchitecture, as well as the intrusion the computing task 109 may have on workloads of the computing device 104. Over time, the intrusiveness machine learning model 110 may be able to better guide future workloads that can be deployed within that computing device 104.

In an example, the intrusiveness machine learning model 110 may be trained to differentiate cache purges that indicate intrusiveness of a machine learning training task. For example, cache purges may happen in normal scenarios. However, some cache purges may occur when a computing device 104 is overloaded when performing a computing task 109. The intrusiveness machine learning model 110 may be trained to identify intrusion based on cache purges (e.g., cache line eviction). In an example, a cache line eviction may be suggestive of moderate intrusion, whereas a translation lookaside buffer (TLB) purge, or hardware page wake events might result a more severe intrusion (e.g., context switches, page swaps). It should be noted that cache line eviction may be one of multiple parameters from which the intrusiveness machine learning model 110 learns and makes decisions about the intrusiveness of a computing task 109.

In some examples, the values of the various performance parameters may be stored in registers of the computing devices 104. A computing device 104 may provide these register values to the intrusiveness machine learning model 110. In some examples, the intrusiveness machine learning model 110 may generate trained values or vectors as the intrusiveness metric 112. The computing devices 104 may send back these trained values or vectors to the scheduler device 102 as opposed to the register values to indicate the intrusiveness of the computing task 109. Therefore, the intrusiveness metric 112 may be a function of the register values, but the register values themselves may not be sent back to the scheduler device 102.

In some examples, the computing devices 104 may include a machine learning isolator. The machine learning isolator may be implemented by a coprocessor to determine the intrusiveness metric 112. The machine learning isolator may limit the intrusion of determining the intrusiveness metric 112 on existing workloads of a computing device 104. The machine learning isolator may be implemented while a computing device 104 performs a computing task 109. For example, the coprocessor may run the intrusiveness machine learning model 110 to determine the intrusiveness metric 112.

In a first aspect of machine learning isolation, the performance of the computing device 104 may be observed without perturbation by the computing task 109. For example, the computing device 104 may determine a baseline of performance characteristics of the computing device 104 when the computing device 104 is not performing the computing task 109. This observation may be aided by debug hooks or performance counters provided by the CPU, GPU and/or machine learning accelerator.

Next, the computing device 104 may determine the impact of the computing task 109 on the performance of the computing device 104. In some examples, a trace of various performance values may be collected in real time to assess intrusiveness while the computing device 104 performs a computing task 109 (e.g., machine learning training task). The traces may be fed to the intrusiveness machine learning model 110 that is local to the computing device 104. However, the intrusiveness machine learning model 110 may not be run on the main target CPU/GPU/MLA as this would perturb the intrusiveness state, and may even cause intrusion when there was not any in the first place. To avoid this, a dedicated machine learning accelerator may be used as a coprocessor that is attached to the host and the traces from various compute entities on the computing device 104 may be streamed to this coprocessor. This coprocessor can run ML models to both assess the intrusion state and predict future intrusion state without impacting the host system of the computing device 104.

In some examples, the coprocessor could be attached through a peripheral component interconnect express (PCIe) interface, universal serial bus (USB) interface, proprietary interconnects, or the coprocessor could also reside within on the compute entities (CPU, GPU, MLA). The traces could be sent to this coprocessor via direct memory access (DMA) engines with the compute entities and sideband even-trace buses. In some examples, the coprocessor could be a memory interface, and could reside within memory as an in-memory computing resource. In this case, the traces may be sent to the coprocessor as memory read/writes.

The scheduler device 102 may receive the intrusiveness metrics 112 from the plurality of computing devices 104. The scheduler 106 may determine distribution of additional computing tasks according to a scheduling machine learning model 108. In some examples, the scheduling machine learning model 108 may be trained to assign the next iteration of computing tasks 109 based on the received intrusiveness metrics 112.

In some examples, the scheduling machine learning model 108 may indicate which computing devices 104 can perform a type of computing task 109. For example, the scheduler 106 may use the scheduling machine learning model 108 to learn which types of machine learning training tasks can be performed on which computing devices 104. In an example, computing devices 104 that report high intrusiveness for a given machine learning training task may be excluded from subsequent scheduling of that type of machine learning training task. Computing devices 104 that report low intrusiveness for a given machine learning training task may be included in subsequent scheduling of that type of machine learning training task.

In some examples, the scheduling machine learning model 108 may be used by the scheduler 106 to learn how well different computing devices 104 can perform a given computing task (e.g., machine learning training task). For example, the scheduler 106 may analyze the intrusiveness metrics 112 to select computing devices 104 for a next iteration of a machine learning training task. Computing devices 104 that report high intrusiveness for a given machine learning training task may be excluded from the next iteration of the machine learning training task. Computing devices 104 that report low intrusiveness for a given machine learning training task may be included in the next iteration of the machine learning training task. Therefore, the scheduler 106 may avoid assigning additional computing tasks 109 to computing devices 104 that report intrusiveness metrics with high intrusiveness. Computing devices that report low intrusiveness may be assigned additional computing tasks 109 to utilize their additional capacity.

In another example, the scheduler 106 may remove irrelevant computing devices 104 from a future machine learning training task to minimize the overall cost while not degrading machine learning model performance. For example, the scheduling machine learning model 108 may indicate which computing devices 104 cannot perform a given machine learning training task. In this case, these computing devices 104 are irrelevant to the machine learning training task. To avoid wasting computing resources and to ensure the performance of the machine learning model, the scheduler 106 may assign future machine learning training tasks to those computing devices 104 that are identified as relevant by the scheduling machine learning model 108.

In some examples, the scheduler 106 may train the scheduling machine learning model 108 to schedule additional computing tasks 109 based on the received intrusiveness metrics 112. For example, the scheduler 106 may use the received intrusiveness metrics 112 as training data to update the scheduling machine learning model 108. In this manner, the scheduling machine learning model 108 may dynamically adapt to changes in the performance of the computing devices 104. For example, the trained scheduling machine learning model 108 may indicate which computing devices 104 should receive a type of computing task 109.

In some examples, the scheduler 106 may use the intrusiveness metric 112 to decide which edge computing devices 104 will be impacted and how this may lead to performance degradation of the computing tasks 109. The intrusiveness metric 112 helps the scheduler 106 to capture the impact of the computing tasks 109. For example, the intrusiveness metric 112 may describe the state of an FL worker on which an ML training was deployed, how long and how often the ML training ran, how much memory the ML training used, CPU utilization, which error was detected, and so on.

In some examples, the intrusiveness metrics 112 from edge computing devices 104 and the ML weights generated by the computing devices 104 may be used as inputs for the scheduling machine learning model 108. The pre-trained scheduling model 108 may be used for online or transfer learning to predict the selected edge computing tasks 109. The intrusiveness function 112 may be used to continually improve the ML scheduler operations as well as the learning procedure.

Figure 2A:
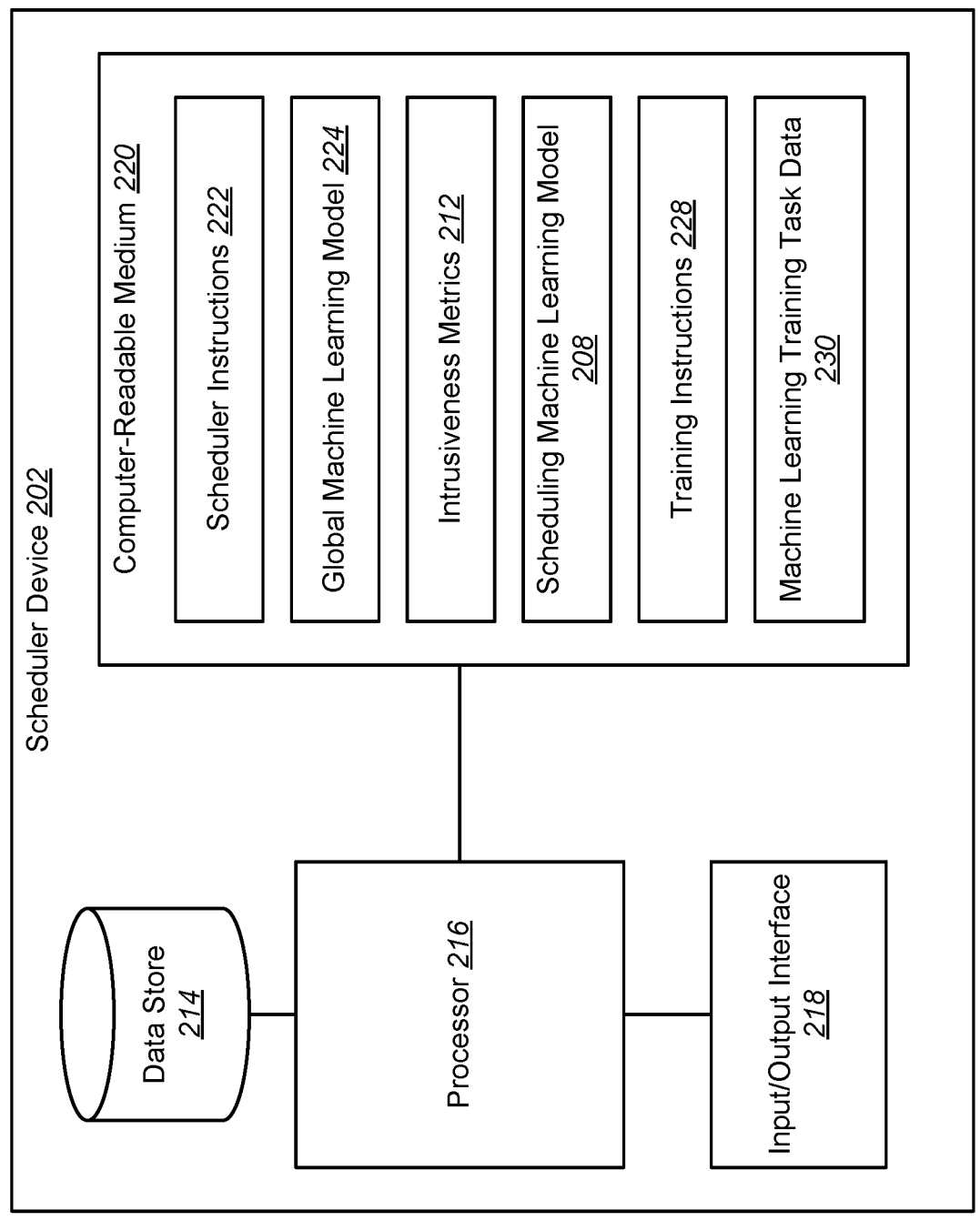
FIGS. 2A and 2B are block diagrams illustrating examples of a scheduler device and a computing device.
Figure 2B:
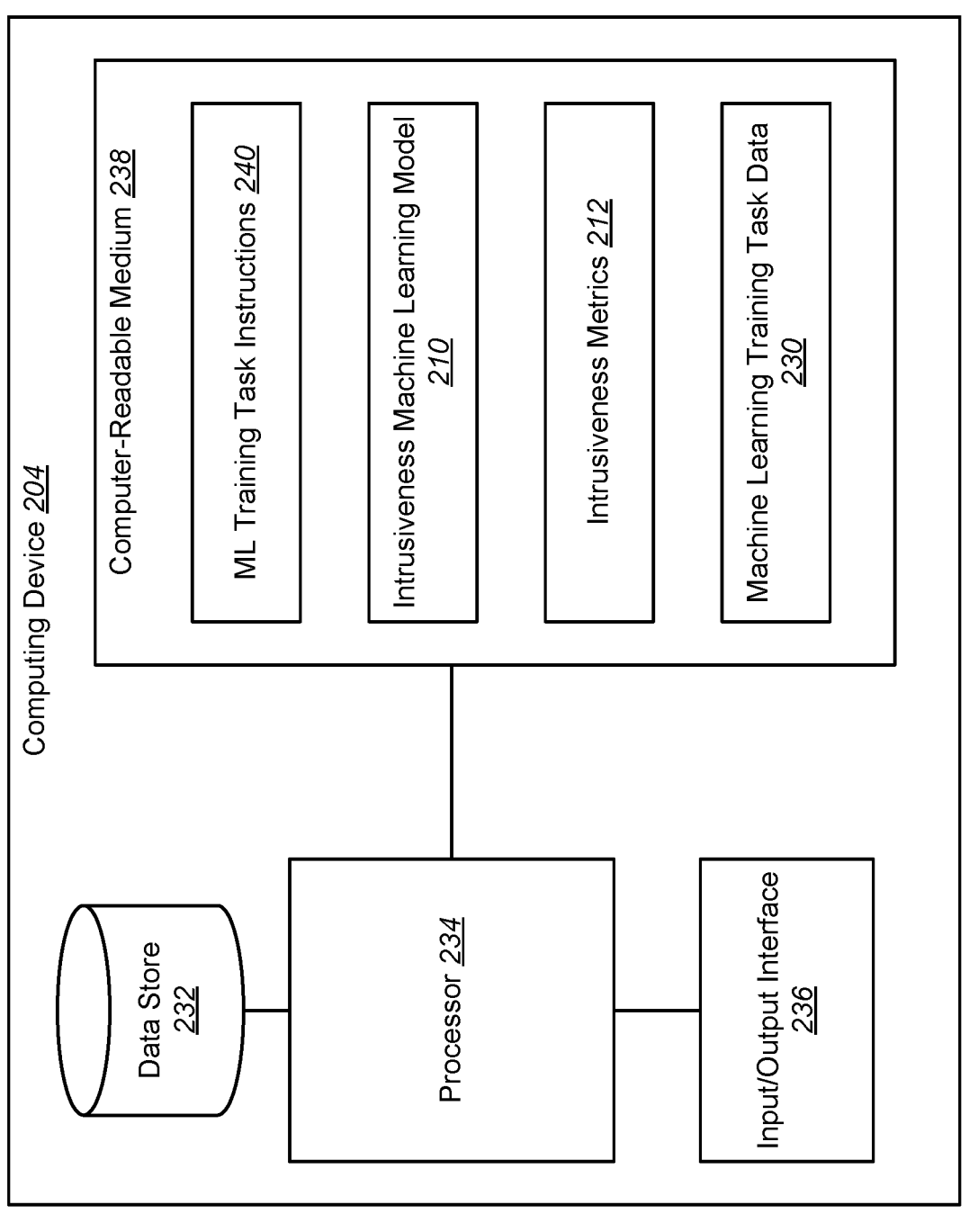

FIGS. 2A and 2B are block diagrams illustrating examples of a scheduler device 202 and a computing device 204. In some examples, the scheduler device 202 and the computing device 204 may be used for distributed machine learning (also referred to as federated learning).

In FIG. 2A, the scheduler device 202 may include and/or may be coupled to a processor 216, a data store 214, an input/output interface 218, and/or a computer-readable medium 220. In some examples, the scheduler device 202 may be in communication with (e.g., coupled to, have a communication link with) a computing device(s) 204. The scheduler device 202 may include additional components (not shown) and/or some of the components described herein may be removed and/or modified without departing from the scope of this disclosure.

The processor 216 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the computer-readable medium 220. The processor 216 may fetch, decode, and/or execute instructions (e.g., scheduler instructions 222, training instructions 228) stored on the computer-readable medium 220. In some examples, the processor 216 may include an electronic circuit or circuits that include electronic components for performing a functionality or functionalities of the instructions (e.g., scheduler instructions 222, training instructions 228). In some examples, the processor 216 may perform one, some, or all of the functions, operations, techniques methods, etc., described in connection with one, some, or all of FIGS. 1-4.

The computer-readable medium 220 may be any electronic, magnetic, optical, or other physical storage device that contains or stores electronic information (e.g., instructions and/or data). Thus, the computer-readable medium 220 may be, for example, Random Access Memory (RAM), Electrically Erasable Programmable Read-Only Memory (EEPROM), a storage device, an optical disc, and the like. In some implementations, the computer-readable medium 220 may be a non-transitory tangible computer-readable medium, where the term "non-transitory" does not encompass transitory propagating signals.

The scheduler device 202 may also include a data store 214 on which the processor 216 may store information. The data store 214 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the computer-readable medium 220 may be included in the data store 214. In some examples, the computer-readable medium 220 may be separate from the data store 214. In some approaches, the data store 214 may store similar instructions and/or data as that stored by the computer-readable medium 220. For example, the data store 214 may be non-volatile memory and the computer-readable medium 220 may be volatile memory.

The scheduler device 202 may further include an input/output interface 218 through which the processor 216 may communicate with an external device or devices (not shown), for instance, to receive and store the intrusiveness metrics 212. The input/output interface 218 may include hardware and/or machine-readable instructions to enable the processor 216 to communicate with the external device or devices. The input/output interface 218 may enable a wired or wireless connection to the external device or devices. The input/output interface 218 may further include a network interface card and/or may also include hardware and/or machine-readable instructions to enable the processor 216 to communicate with various input and/or output devices, such as a keyboard, a mouse, a display, another apparatus, electronic device, computing device, etc., through which a user may input instructions into the scheduler device 202.

The computer-readable medium 220 may include scheduler instructions 222. In some examples, the scheduler instructions 222 may include executable code to cause the processor 216 to determine the distribution of additional computing tasks according to a scheduling machine learning model 208 and intrusiveness metrics 212 received from the computing devices 204. This may be accomplished as described in FIG. 1.

In the case of distributed machine learning, the computer-readable medium 220 may include a global machine learning model 224. In some examples, the global machine learning model 224 may be a machine learning model that the scheduler device 202 assigns other computing devices 204 to train. The scheduler device 202 may determine a subset of computing devices 204 to perform training for the global machine learning model 224. For example, the scheduler device 202 may assign machine learning training tasks to the computing devices 204 based on the scheduling machine learning model 208. When a computing device 204 performs the assigned training task, the computing device 204 may send machine learning training task data 230 (e.g., weight updates) to the scheduler device 202. The scheduler device 202 may update the global machine learning model 224 based on the received machine learning training task data 230. The computing device 204 may also report the intrusiveness metric 212 for performing the assigned training task.

The scheduler device 202 may include training instructions 228 to train the scheduling machine learning model 208 to schedule additional computing tasks based on the received intrusiveness metrics 212. For example, the scheduler device 202 may update the scheduling machine learning model 208 using the intrusiveness metrics 212 as training data.

In FIG. 2B, the computing device 204 may include a data store 232, processor 234, input/output interface 236 and/or computer-readable medium 238 implemented in accordance with the data store 214, processor 216, input/output interface 218 and computer-readable medium 220 described in connection with FIG. 2A. The computer-readable medium 238 may include machine learning task instructions 240 to cause the processor 234 to perform a machine learning training task to generate machine learning training task data 230 (e.g., weight updates). The machine learning task instructions 240 cause the processor 234 to determine an intrusiveness metric 212 using an intrusiveness machine learning model 210 in response to performing the machine learning training task. The machine learning task instructions 240 also cause the processor 234 to report the intrusiveness metric 212 and the machine learning training task data 230 to the scheduler device 202.

In the case of distributed machine learning, the scheduler device 202 may initialize machine learning model parameters. The scheduler device 202 may also select a subset of computing devices 204 to perform the machine learning task (e.g., training) instead of using all available candidate computing devices 204. The scheduler device 202 may start an iterative process of assigning the machine learning tasks to the computing devices 204.

In distributed machine learning (such as data parallelism), local computations may be performed on computing devices 204 and model parameters may be exchanged among the other computing devices 204 and the scheduler device 202. In distributed machine learning, the scheduler device 202 may also be referred to as a parameter server or aggregator. The scheduling of the machine learning tasks (e.g., training) may be performed in an iterative manner.

In some examples, a distributed machine learning (e.g., federated learning) procedure may be defined by three sequential phases: selection, configuration, and reporting. During the selection phase, the computing devices 204 may check-in to the scheduler device 202, which selects a subset of computing devices 204 to perform a machine learning task. The scheduler device 202 may read a machine learning model (e.g., from a checkpoint) from persistent storage and may distribute the model to the selected computing devices 204.

In the configuration phase, each computing device 204 trains the machine learning model with its local dataset. In some examples, a computing device 204 may train a subset of the global machine learning model 224.

In the reporting phase, each computing device 204 may send back the local updated model to the scheduler device 202. This update may result in a large amount of information (e.g., weight updates). For example, the training of machine learning language models may generate a large amount of information. The scheduler device 202 may aggregate the model updates from the computing devices 204 as they arrive into the global machine learning model 224. The scheduler device 202 may write the global model checkpoint into persistent storage.

Due to a potential large number of FL workers and the convergence latency (e.g., average job completion time) of machine learning tasks, an efficient selection of relevant FL workers (e.g., computing devices 204) may be performed. To achieve this goal, a deeper instrumentation may be performed on each computing device 204 to determine how a loaded or unloaded processor (CPU) or GPU on a computing device 204 behaves when a machine learning task is deployed on it.

Based on the local data collected, such as the execution trace and logs, a computing device 204 can determine how intrusive a task or active applications have been. The computing device 204 may also determine its performance and health. Since a computing device 204 might be running other tasks, by performing this deep analysis of the capabilities of the computing device 204, insights are obtained about what type of tasks can be assigned to a computing device 204 and when.

In an example, a translation lookaside buffer (TLB) purge may indicate a context switch. This level of intrusiveness may be identified by a trained intrusiveness machine learning model 210.

The computing device 204 may report the intrusiveness metric 212 back to the scheduler device 202 during the reporting phase. The scheduler device 202 may use the intrusiveness metric 212 to optimally deploy machine learning tasks on the computing device 204 on future iterations. Instead of reporting aggregated device metrics or raw device data to the scheduler device 202, which may lead to higher bandwidth consumption and latency, the analysis of the intrusiveness is performed locally on the computing device 204 using the intrusiveness machine learning model 210. The generated intrusiveness metric 212 is reported to the scheduler device 202.

In the reporting phase described above, the computing devices 204 may report back the intrusiveness metric 212 representing the impact of a task on the computing device 204. In some examples, the intrusiveness may be defined through timestamps and generated when a task (i.e., block of code) starts and ends. This is known as code or device instrumentation.

Hardware counter information may be collected by using a counters engine, trace cache, performance monitors, bus/QuickPath Interconnect (QPI) traces, instruction and branch traces, timestamps, etc. Examples of the performance parameters that may be provided to the intrusiveness machine learning model 110 include CPU usage, memory usage, GPU usage, disk usage, input/output interface usage, the operating system (OS) of the computing devices 104, the percentage of CPU maximum frequency, the percentage of CPU throttled cycles, percentage of resources stalls for a given application (e.g., machine learning training task) execution, etc. The data collection may be defined for a given application (e.g., a given machine learning training task).

The intrusiveness metric 212 may be used to opportunistically borrow cycles from the computing device 204 to perform the distributed machine learning procedure. The intrusiveness metric 212 helps to capture the impact of the tasks. For example, the intrusiveness metric 212 may indicate the state of the computing device 204 on which the machine learning training task was deployed, how long and how often the machine learning training task ran, how much memory the machine learning training task used, CPU utilization, which error(s) was detected, and so on. The intrusiveness metric 212 can also help to coordinate between multiple training tasks. For instance, the scheduler device 202 may avoid assigning additional training tasks on a computing device 204 that is overloaded with multiple training sessions.

The scheduler device 202 may analyze the intrusiveness metric 212 and use it to select the computing device 204 for the next iteration of a machine learning training task. The intrusiveness metric 212 may be used to continually improve the machine learning scheduler operations as well as the learning procedure. Since the scheduler device 202 is acting as the orchestrator, irrelevant computing devices 204 are removed to minimize the overall cost while not degrading the performance of the global machine learning model 224.

In some examples, to reduce latency during the selection phase, straggling computing devices 204 that do not report their intrusiveness metric 212 and machine learning training task data 230 on time to the scheduler device 202 or do not react to a configuration request by the scheduler device 202 may be ignored. The scheduler device 202 may train the scheduling machine learning model 208 to account for straggling computing devices 204.

The intrusiveness metric 212 may also be used to quantify the dropout rates of the computing device 204. The dropout rate can be used to define a threshold for selecting the target computing devices 204 for a computing task. For example, if the average dropout rate is 5% of the computing devices 204, the scheduler device 202 can select 120% of the targeted optimal computing device 204 to initially start a distributed machine learning task. The dropout rates may be included in the trained scheduling machine learning model 208. Hence, the scheduling machine learning model 208 may be used to compensate for discarded straggler devices and drop out devices.

In some examples, the scheduler device 202 may run the computing device selection process continuously, instead of running the three phases (i.e., selection, configuration and reporting) in sequence. In this case, the selection phase of the next iteration can be run in parallel (e.g., a pipeline approach) with the configuration and reporting of previous iteration.

FIG. 3 is a flow diagram illustrating an example method 300 by a computing device 104. The computing device 104 may perform 302 a computing task 109 assigned by a scheduler device 102. For example, the scheduler device 102 may assign a machine learning training task to the scheduler device 102. The scheduler device 102 may perform the machine learning training using a local dataset.

The computing device 104 may determine 304 an intrusiveness metric 112 that indicates the impact of the computing task 109 on the performance of the computing device 104. The intrusiveness metric 112 may characterize intrusiveness of the computing task 109 on other simultaneous processes performed by the computing device 104.

The intrusiveness metric 112 may be determined with an intrusiveness machine learning model 110. In some examples, the intrusiveness machine learning model 110 may be a local machine learning model that is trained to generate the intrusiveness metric 112 as a function of performance parameters of the computing device 104. In some examples, the values of the various performance parameters may be stored in registers of the computing device 104 and may be provided to the intrusiveness machine learning model 110. The intrusiveness metric 112 may be a vector generated by the intrusiveness machine learning model 110. In some examples, the computing device 104 may include a machine learning isolator implemented by a coprocessor to determine the intrusiveness metric 112.

The computing device 104 may send 306 the intrusiveness metric 112 to the scheduler device 102 to determine distribution of additional computing tasks according to a scheduling machine learning model 108. For example, the scheduler device 102 may apply the intrusiveness metric 112 to the scheduling machine learning model 108 that is trained to indicate which computing devices 104 can perform a type of computing task based on the intrusiveness metric 112. The scheduler device 102 may select or avoid the computing device 104 for a next iteration of the computing task 109 based on the intrusiveness metric 112.

FIG. 4 is a flow diagram illustrating an example method 400 by a scheduler device 102. The scheduler device 102 may receive 402, from a plurality of computing devices 104, intrusiveness metrics 112 that indicate the impact of computing tasks 109 on performance of the computing devices 104. The intrusiveness metrics 112 may be determined by a local intrusiveness machine learning model 110 on the computing devices 104. A given computing device 104 may determine the intrusiveness metric 112 in response to performing a computing task (e.g., machine learning training task) assigned by the scheduler device 102.

The scheduler device 102 may determine 404 the distribution of additional computing tasks 109 according to a scheduling machine learning model 108 and the intrusiveness metrics 112. The scheduling machine learning model 108 may be trained to indicate which computing devices 104 can perform a computing task 109 based on the intrusiveness metrics 112. For example, the scheduler device 102 may use the scheduling machine learning model 108 to learn which types of machine learning training tasks can be performed on which computing devices 104. The scheduler device 102 may also use the scheduling machine learning model 108 to learn how well different computing devices 104 can perform a given machine learning training task.

In some examples, the scheduler device 102 may analyze the intrusiveness metrics 112 to select computing devices 104 for the next iteration of a computing task 109 (e.g., machine learning training task). The scheduler device 102 may avoid assigning additional computing tasks 109 to computing devices 104 that report intrusiveness metrics with high intrusiveness. In some examples, the scheduler device 102 may remove irrelevant computing devices 104 from a future machine learning training task to minimize the overall cost while not degrading machine learning model performance.

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:

1. A method by a computing device, comprising:

determining an intrusiveness metric that indicates an impact of a computing task on performance of a computing device, the intrusiveness metric being determined with an intrusiveness machine learning model; and sending the intrusiveness metric to a scheduler device to determine distribution of additional computing tasks according to a scheduling machine learning model, wherein the scheduler device further receives additional intrusiveness metrics from additional computing devices and determines the distribution of the additional computing tasks also according to the intrusiveness metric and the additional intrusive metrics, and wherein the additional intrusiveness metrics are determined by additional intrusiveness machine learning models on the additional computing devices.

2. The method of claim 1, wherein the computing task comprises training a machine learning training task received from the scheduler device.

3. The method of claim 1, wherein the intrusiveness metric characterizes intrusiveness of the computing task on other simultaneous processes performed by the computing device.

4. The method of claim 1, wherein the intrusiveness metric comprises a vector generated by the intrusiveness machine learning model.

5. The method of claim 1, wherein the computing device includes a machine learning isolator implemented by a coprocessor to determine the intrusiveness metric.

6. A scheduler device, comprising:

a memory;

a processor coupled to the memory, wherein the processor is to:

receive, from a plurality of computing devices, intrusiveness metrics that indicate an impact of computing tasks on performance of the computing devices, the intrusiveness metrics being determined by an intrusiveness machine learning model on the computing devices; and determine distribution of additional computing tasks according to a scheduling machine learning model and the intrusiveness metrics.

7. The scheduler device of claim 6, wherein the scheduling machine learning model is trained to indicate which computing devices can perform a computing task.

8. The scheduler device of claim 6, wherein the scheduling machine learning model is used by the scheduler device to learn which types of machine learning training tasks can be performed on which computing devices.

9. The scheduler device of claim 6, wherein the scheduling machine learning model is used by the scheduler device to learn how well different computing devices can perform a given machine learning training task.

10. The scheduler device of claim 6, wherein the processor is to train the scheduling machine learning model to schedule additional computing tasks based on the received intrusiveness metrics.

11. The scheduler device of claim 6, wherein the processor is to analyze the intrusiveness metrics to select computing devices for a next iteration of a machine learning training task.

12. The scheduler device of claim 6, wherein the processor is to avoid assigning additional computing tasks to computing devices that report intrusiveness metrics with high intrusiveness.

13. The scheduler device of claim 6, wherein the processor is to remove irrelevant computing devices from a future machine learning training task to minimize overall cost while not degrading machine learning model performance.

14. A non-transitory tangible computer-readable medium storing executable code, comprising:

code to cause a processor to receive a machine learning training task from a scheduler device;

code to cause the processor to determine an intrusiveness metric using an intrusiveness machine learning model in response to performing the machine learning training task; and code to cause the processor to report the intrusiveness metric to the scheduler device, wherein, the scheduler device further receives additional intrusiveness metrics determined by additional intrusiveness machine learning models on additional computing devices, and determines distribution of additional computing tasks according to a scheduling machine learning model, the intrusiveness metric, and the additional intrusiveness metric.

15. The computer-readable medium of claim 14, wherein the intrusiveness machine learning model is trained to differentiate cache purges that indicate intrusiveness of the machine learning training task.

16. The computer-readable medium of claim 14, wherein the computing task comprises training a machine learning training task received from the scheduler device.

17. The computer-readable medium of claim 14, wherein the intrusiveness metric characterizes intrusiveness of the machine learning task on other simultaneous processes performed by a computing device.

18. The computer-readable medium of claim 14, wherein the intrusiveness metric comprises a vector generated by the intrusiveness machine learning model.

19. The computer-readable medium of claim 14, wherein the intrusiveness machine learning model includes a machine learning isolator implemented by a coprocessor to determine the intrusiveness metric.

* * * * *